(No Model.) 2 Sheets—Sheet 1.
O. WEYRICH.
THERMOMETRIC ALARM.

No. 509,985. Patented Dec. 5, 1893.

(No Model.)

2 Sheets—Sheet 2.

O. WEYRICH.
THERMOMETRIC ALARM.

No. 509,985.                    Patented Dec. 5, 1893.

Witnesses
A. J. Hadden
J. Bolte

Inventor
Otto Weyrich
by his Attorney R. Hadden

UNITED STATES PATENT OFFICE.

OTTO WEYRICH, OF ELBERFELD, GERMANY, ASSIGNOR TO ISIDOR CAHN, OF SAME PLACE.

THERMOMETRIC ALARM.

SPECIFICATION forming part of Letters Patent No. 509,985, dated December 5, 1893.

Application filed May 16, 1893. Serial No. 474,443. (No model.)

*To all whom it may concern:*

Be it known that I, OTTO WEYRICH, a subject of the Emperor of Germany, residing at Elberfeld, Rhenish Prussia, Germany, have invented certain new and useful Improvements in Thermometers, of which the following is a specification, reference being made to the annexed drawings, in which—

Figure 1:
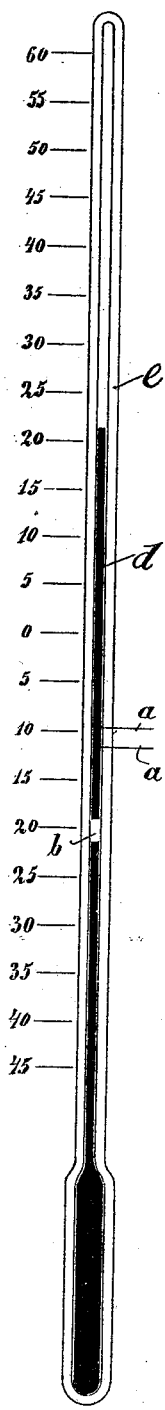
Figure 2:
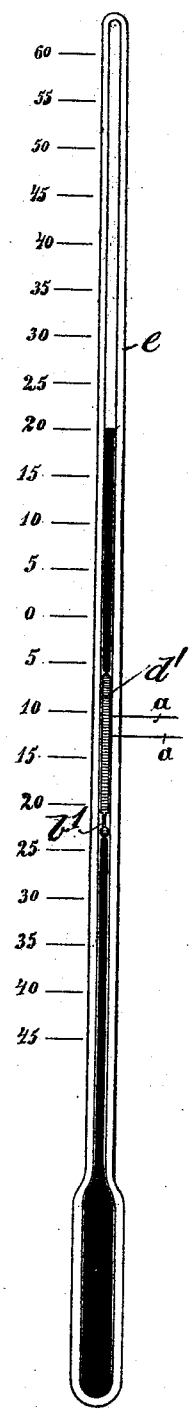

Figure 1 is an elevation of a thermometrical tube constructed according to this invention, and Fig. 2 is a similar view of a modification thereof.

This invention relates to a thermometer which is intended to cause an alarm to be given whenever the temperature prevailing in the place where the thermometer is situated exceeds a certain degree for which the thermometer is constructed, and the invention consists in an improved construction of such thermometer whereby on the alarm temperature being reached the circuit of an electric current is broken and signaling apparatus released and set in action.

In the improved thermometer, the upper part of the column, which part is of electrically conductive material, is separated from the remainder by a non conductive interval. Thus in Fig. 1 which shows such a thermometer, the upper part $d$ of the column may be of mercury separated from the lower part by a bubble of an inert gas, preferably nitrogen as shown at $b$ Fig. 1 of the annexed drawings and the wires $a\,a$ of the electric circuit are led into the glass $e$ at such a point or points that during normal temperature the circuit is closed by the detached column of mercury $d$ above the bubble $b$. When the heat rises to a temperature at which alarm is to be given, expansion of the lower part of the column of mercury will cause the bubble $b$ to rise so as to arrive at the wires $a$ and interrupt the electric circuit. In place of thus detaching the column of mercury to form an upper part $d$, a float $d'$ such as is shown in Fig. 2 may be placed in the tube above the mercury column, the movements of which this float will follow. The float $d'$, which is made of any suitable material conducting electricity, is provided near its lower end with an annular recess $b'$ taking the place of the bubble $b$. When this recess arrives so high as to cut the circuit the current ceases and the signal is caused to sound. Any number of thermometers as herein described for continuous current may be inserted in the same circuit and if any one of these rises to such temperature that the current is interrupted, the ceasing of the current will set a suitably contrived signal in action.

I claim—

An alarm thermometer adapted to interrupt an electric current on attaining a predetermined temperature, the same having at the upper part of its column an electrically conductive portion separated from the remainder of the column by an electrically non conductive interval of substantially unalterable amount and circuit wires registering with the column.

In witness whereof I have signed this specification in presence of two witnesses.

OTTO WEYRICH.

Witnesses:
WM. ESSENWEIN,
RUDOLPH FRICKE.